Dec. 2, 1969    E. A. WILKOWSKI    3,481,436
CLUTCH FOR A VEHICLE DRIVE
Filed Nov. 30, 1967    3 Sheets-Sheet 1

INVENTOR.
EDWARD A. WILKOWSKI
BY
*Young, Raney, Flynn and Tarolli*
ATTORNEYS

Dec. 2, 1969  E. A. WILKOWSKI  3,481,436
CLUTCH FOR A VEHICLE DRIVE
Filed Nov. 30, 1967  3 Sheets-Sheet 2
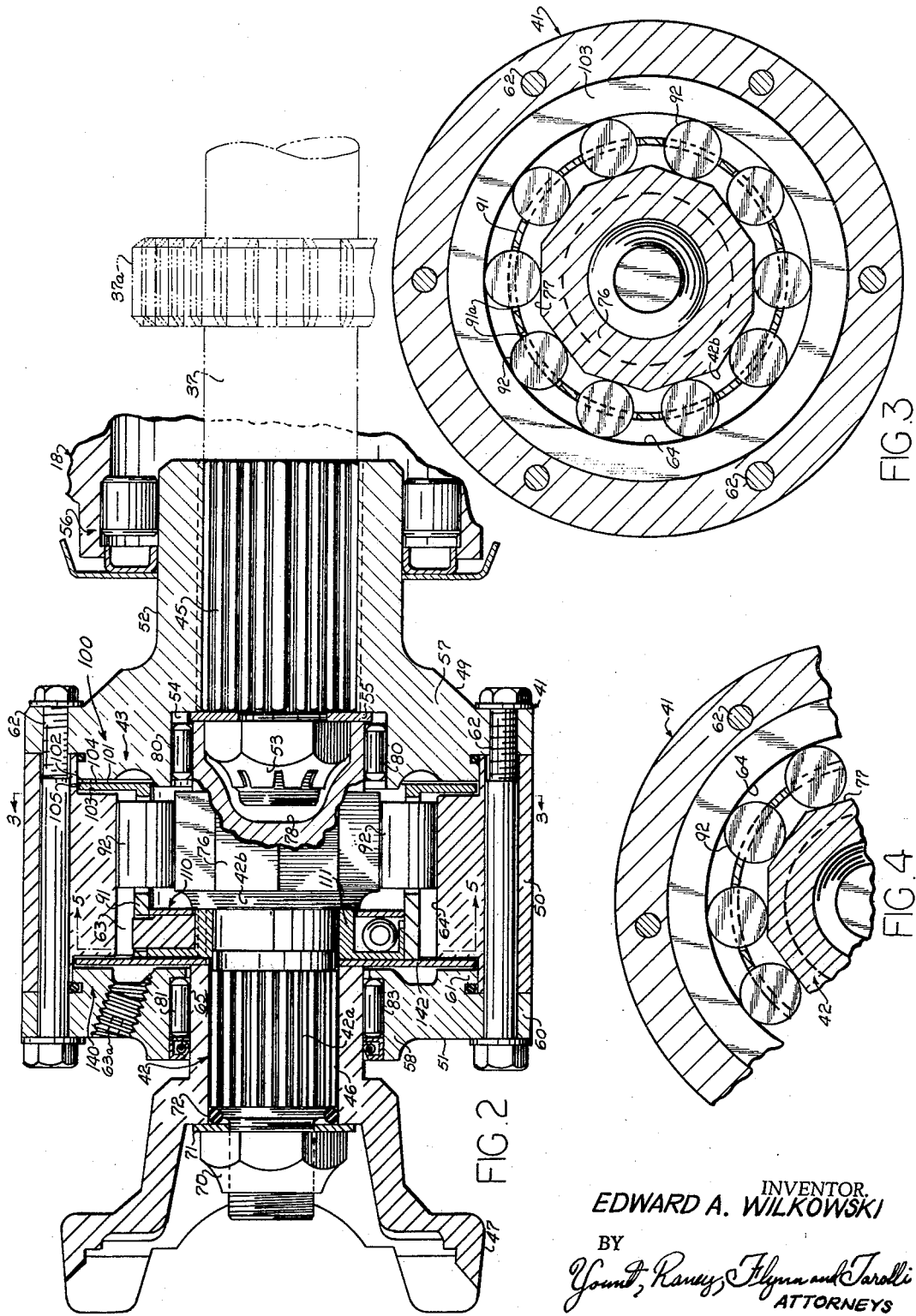
INVENTOR.
EDWARD A. WILKOWSKI
BY
Yount, Raney, Flynn and Tarolli
ATTORNEYS Dec. 2, 1969  E. A. WILKOWSKI  3,481,436

CLUTCH FOR A VEHICLE DRIVE

Filed Nov. 30, 1967  3 Sheets-Sheet 3

INVENTOR.
EDWARD A. WILKOWSKI
BY
*Yount, Raney, Flynn and Tarolli*
ATTORNEYS

United States Patent Office 3,481,436
Patented Dec. 2, 1969

3,481,436
CLUTCH FOR A VEHICLE DRIVE
Edward A. Wilkowski, Marshall, Mich., assignor to Eaton Yale & Towne Inc., Cleveland, Ohio, a corporation of Ohio
Filed Nov. 30, 1967, Ser. No. 686,978
Int. Cl. F16d 13/04, 47/00
U.S. Cl. 192—35                                16 Claims

ABSTRACT OF THE DISCLOSURE

The present specification discloses a drive mechanism operable to provide for driving front wheels of a vehicle when the rear wheels of the vehicle slip. The drive mechanism includes a clutch means which drivingly connects input and output drive elements in response to a predetermined degree of relative rotation between the drive elements. The clutch means is biased to a disengaged position by biasing means. The drive mechanism also includes a viscous shear drive coupling for driving one coupling member from the other to prevent engagement of the clutch under certain conditions.

---

The present invention relates to a drive which includes input and output members and a clutch therebetween, and more particularly relates to a drive for a vehicle having primary and auxiliary ground engaging driving wheels and wherein, the auxiliary ground engaging wheels of the vehicle are driven through the clutch upon a loss of traction of the primary driving wheels.

Vehicles having primary and auxiliary ground engaging driving wheels are known. Such vehicles have been equipped with transmission means for permitting the vehicle to be driven only by the primary ground engaging wheels with the auxiliary ground engaging wheels being in a free-wheeling condition. A commonly known vehicle of this type is a "Jeep" vehicle wherein the vehicle can be operated in either "four-wheel drive" or "two-wheel drive" as desired by the operator of the vehicle.

Vehicles of the type noted above have been provided with a drive coupling in the drive train for the auxiliary ground engaging wheels and which is operable to automatically drive the auxiliary ground engaging wheels in response to loss of traction of the primary ground engaging wheels. Such construction permits the vehicle to be driven only by the primary ground engaging wheels and yet automatically provides for driving of the auxiliary ground engaging wheels upon loss of traction by the primary wheels. More specifically, a drive coupling is utilized between input and output drive elements of the drive train for the auxiliary wheels such that the coupling drivingly connects the input and output elements for the auxiliary wheels in response to a predetermined rotational slip speed between the elements which results from loss of traction by the primary ground engaging wheels. The output element is connected with the auxiliary wheels and the input element is connected with the transmission. A vehicle drive of this type is disclosed in U.S. patent application, Ser. No. 347,837, now Patent No. 3,300,002, assigned to assignee of this invention and to which reference is hereby made.

In some instances, when a vehicle is equipped with an automatic coupling of the type described and the vehicle is being driven in "two-wheel drive" a loud, cyclic thumping noise is readily discernible, which noise results from engagement and disengagement of the driving elements for the auxiliary wheels. It has been found that when the vehicle is being operated in "two-wheel drive" the output drive element which is drivingly connected to the auxiliary ground engaging wheels is rotated at a speed which is proportional to the speed of the auxiliary wheels as the vehicle moves along the ground while the input drive element, which is connected between the transmission and the coupling, tends to come to rest. Whenever the speed of the input drive element reduces sufficiently, the coupling connects the drive elements and drives the input element from the output element. This engagement results not only in the aforementioned undesirable thumping noise but also in wear of parts of the coupling and the drive elements.

Accordingly, a principal object of the present invention is the provision of a new and improved drive wherein a clutch transmits torque between input and output members in response to relative rotation therebetween and wherein means is provided for driving the input member by the output member to prevent undesired engagement of the clutch.

A further object of the present invention, is the provision of a new and improved vehicle drive having primary and auxiliary driving wheels and wherein the auxiliary driving wheels are automatically rendered effective to drive the vehicle upon a loss of traction of the primary drive wheels and wherein the drive is simple in construction, durable, reliable in operation and effective to eliminate engagement of drive members associated with the auxiliary wheels when the primary wheels only are driving the vehicle which would otherwise result in undesirable noise and wearing of elements of the drive.

Another object of the present invention is the provision of a new and improved vehicle drive including primary ground engaging wheels and auxiliary ground engaging wheels and a drive therefor operable between a first condition wherein only the primary ground engaging wheels are effective to drive the vehicle and a second condition wherein the primary ground engaging wheels drive the vehicle and the auxiliary ground engaging wheels are rendered effective to drive the vehicle upon a predetermined slip speed between the primary ground engaging wheels and the auxiliary ground engaging wheels and wherein the drive includes a drive coupling between first and second driving members in the drive train for the auxiliary ground engaging wheels and which coupling is effective to drivingly connect the first and second driving members upon a predetermined speed of relative rotation therebetween to effect driving of the auxiliary wheels, and wherein the coupling means includes means effective to maintain the relative speed of rotation between the first and second driving members below the predetermined relative speed and when the drive is in its first condition.

Another object of the present invention is the provision of a new and improved vehicle drive, as set forth in the next preceding paragraph, wherein the last mentioned means includes a fluid coupling operatively connected with the first and second members and effective to transmit motion from the one member to the other of the driving members to maintain the speed of relative rotation therebetween below the predetermined relative speed.

Another object of the present invention is the provision of a new and improved vehicle drive, as set forth in the next preceding paragraph, wherein the fluid coupling comprises a viscous shear coupling including a disc member connected to the drive element for driving the auxiliary wheels, and a surface is formed on a coupling member connected to the other drive element, and a viscous shear fluid between the surface and the disc member.

Another object of the present invention is the provision of a new and improved drive for automatically driving auxiliary wheels upon slipping or loss of traction of the primary drive wheels and wherein the drive includes a coupling having a first and second coupling member and an overrunning clutch means responsive to relative rotation of the coupling members to drivingly connect the first and second coupling members and wherein the overrunning clutch means includes biasing means biasing a clutch member to an inoperative position so that the coupling members are drivingly connected by movement of the clutch means against the biasing means upon a predetermined differential speed between the first and second coupling members and wherein the biasing means is so constructed and arranged that the clutch member is positively maintained in a position wherein it is inoperative to drivingly connect the coupling members at speeds below the predetermined speed and impacting between elements of the clutch means and the coupling members is minimized.

Another object of the present invention is the provision of a new and improved drive as set forth in the next preceding paragraph wherein the spring means includes detent means comprising a cam surface and a portion of a spring member and wherein the spring member is cammed to a position wherein the clutch member is inoperative to drivingly connect the coupling members when the coupling members are rotating a relative speeds below the predetermined speed and is cammed along the surface toward a position wherein the coupling members are drivingly connected by the clutch member at the predetermined differential in speed between the coupling members.

A still further object of the present invention is the provision of a new and improved drive for automatically driving auxiliary wheels of a vehicle upon slipping or loss of traction of the primary drive wheels thereof and wherein the drive includes a coupling having first and second coupling members and an over-running clutch means responsive to relative rotation or slip of the coupling members to drivingly connect first and second coupling members and in which the overrunning clutch means includes biasing means for urging a member of the clutch means to an inoperative position at slip speeds below a predetermined speed and wherein the biasing means includes a spring which is resiliently compressed at the predetermined slip speed between the first and second coupling members and permits movement of the clutch member to an operative position wherein the coupling members are drivingly connected.

Other objects and advantages of the present invention will become apparent from a consideration of the following detailed description thereof made with reference to the accompanying drawings which form a part of the specification and wherein:

FIG. 2 is an axial fragmentary cross-sectional view of a portion of the vehicle drive of FIG. 1 taken approximately at the lines 2—2 of FIG. 1 and shown on a larger scale than that of FIG. 1;

FIG. 3 is a sectional view taken approximately at the line 3—3 of FIG. 2;

FIG. 4 is a fragmentary sectional view of the portion of the vehicle drive of FIG. 3 in an operative condition thereof;

Figure 1:
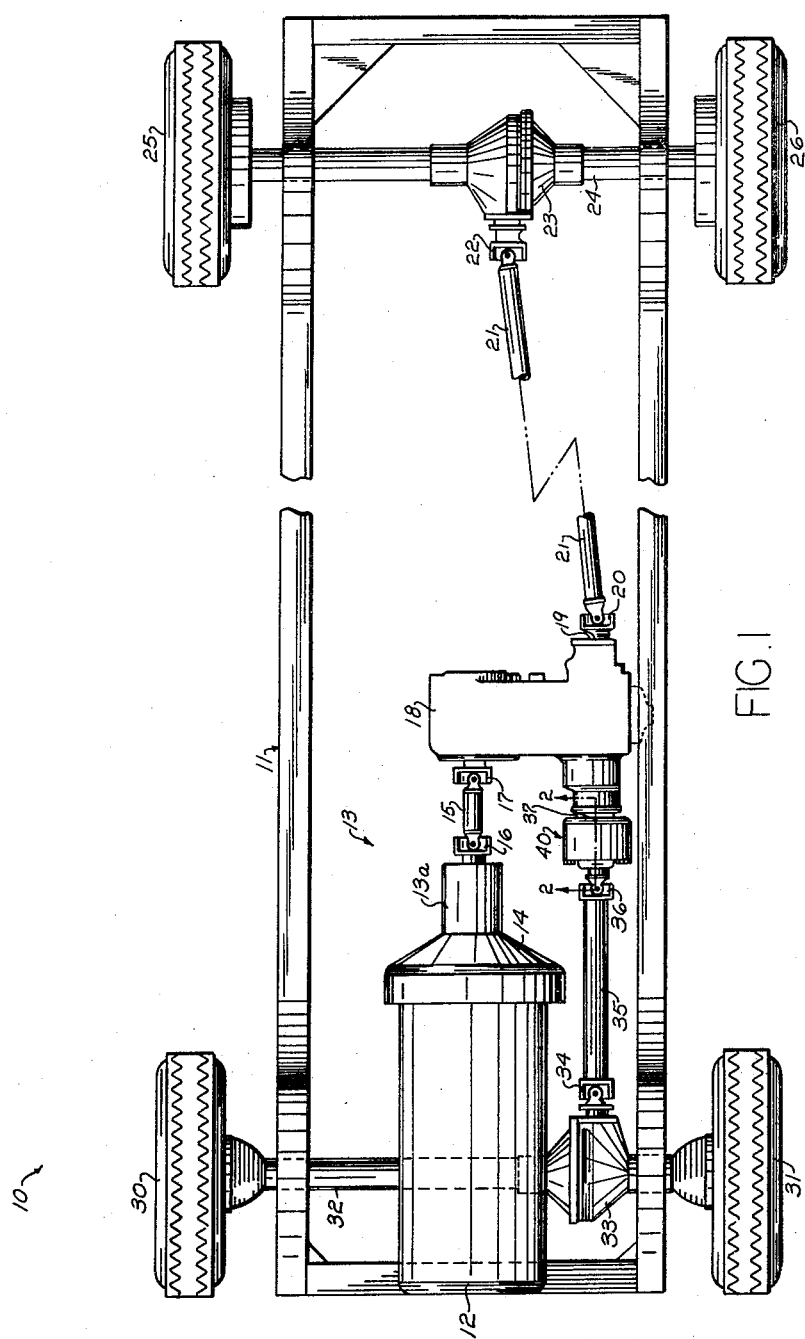
FIG. 1 is a schematic plan view of a portion of a vehicle showing a general drive arrangement therefor and embodying the present invention.

The present invention is directed to a drive, preferably for a vehicle having primary and auxiliary ground engaging drive wheels and wherein the auxiliary drive wheels are rendered operative to be driven automatically upon loss of traction of the primary drive wheels. The drive may be used in any vehicle, but primarily is used in military and construction vehicles. One important use for such a drive is in "Jeep" vehicles which are used both on and off road surfaces with two-wheel drive being preferable for on road use and four-wheel drive desirable under certain conditions both on and off the road. While the invention is described herein in reference to a four-wheeled vehicle, and the terms "two-wheel drive" and "four-wheel drive" are frequently used, it is to be understood that these terms refer to operation of the vehicle wherein only the primary drive wheels are capable of driving the vehicle and operation wherein the primary and auxiliary wheels are capable of driving the vehicle, respectively, and that the invention is suitable for use in conjunction with vehicles having any number of primary and auxiliary driving wheels. A preferred embodiment of the present invention is shown in the drawings and described hereinbelow in relation to a four-wheel drive vehicle generally designated 10.

Referring to FIG. 1, the vehicle 10 comprises a frame 11 which supports an internal combustion engine 12. The internal combustion engine 12 is connected to a suitable transmission means 13 including a gear box 13a through a suitable clutch assembly 14, all as is well known in the art. The gear box 13a is preferably connected to a shaft member 15 through a universal coupling 16. A universal coupling 17 connects the other end of the shaft member 15 to a transfer box mechanism 18. While the gear box 13a and transfer box mechanism 18 are interconnected, as described above, it should be understood that the gear box and transfer box may be integrally disposed.

The transfer box mechanism 18 has a suitable primary output drive shaft 19 which is connected by a universal coupling 20 to a propeller shaft 21. The end of the shaft 21, opposite the end connected to the coupling 20, is connected by a universal coupling 22 to a differential mechanism 23 for driving the rear axle 24 of the vehicle 10. The rear axle 24 of the vehicle 10 carries the primary drive wheels 25, 26 at its opposite ends. In the preferred embodiment, the primary drive wheels 25, 26 form the rear drive wheels of the vehicle 10.

The vehicle 10 also includes an auxiliary set of drive wheels, or front wheels, 30, 31 supported on opposite ends of the front axle 32 which is supported by the frame 11 of the vehicle 10. The front wheels 30, 31 or auxiliary drive wheels are normally not driven, however, they are driven under conditions as will be described hereinbelow. A differential drive mechanism 33 is associated with the front axle 32, and the differential drive mechanism 33 is connected through a universal coupling 34 to a propeller shaft 35. The end of the propeller shaft 35 opposite the end connected to the universal coupling 34 is connected through a universal coupling 36 to a coupling mechanism 40 which is operatively associated with an auxiliary output drive shaft 37 from the transfer box 18, in a manner which will be described presently.

The transfer box 18, which is not illustrated in detail, includes a suitable gear train which is manually operable between a first "two-wheel drive" condition wherein only the primary drive wheels 25, 26 are effective to drive the vehicle, and a second "four-wheel drive" condition wherein the wheels 25, 26 drive the vehicle and the auxiliary drive wheels 30, 31 are rendered capable of driving the vehicle under circumstances to be described. The front or auxiliary wheels are driven from the output shaft 37 of the transfer box 18 through the coupling 40, shaft 35, and the differential drive mechanism 33. Transfer boxes capable of functioning as described are conventional and therefore the specific details of the gearing and construction of the transfer box 18 will not be described and only one gear 37a, fixed to the shaft 37, is illustrated.

When the transfer box 18 is in its "four-wheel drive" condition the auxiliary drive wheels 30, 31 are driven upon slipping or a loss of traction of the primary drive wheels 25, 26. Under driving conditions wherein the drive wheels 25, 26 have sufficient traction to drive the vehicle, the wheels 30, 31 rotate at the speed of the drive wheels 25, 26 and thus are, in a sense, geared to the wheels 25, 26. As noted previously, the transfer box 18 contains gearing operable to transmit drive from the prime mover to the auxiliary and primary driving wheels and this gearing is effective to drive the shafts 21, 37 at all times when the transfer box is in its "four-wheel drive" condition. Thus, in "four-wheel drive" the rotational speed of the auxiliary output shaft 37 bears a definite and fixed relationship to the speed of rotation of the primary propeller shaft 21 and primary driving wheels 25, 26 while the speed of rotation of the propeller shaft 35 is determined by the speed of the auxiliary wheels 30, 31 when the vehicle is being driven by the wheels 25, 26.

Under the driving conditions noted above, the coupling 40 permits the propeller shaft member 35 to rotate freely with respect to the drive mechanism in the transfer box 18 and the shaft members 21, 37 as will be described hereinbelow. When the drive wheels 25, 26 lose traction, the shafts 21, 37 are driven at a different rotational speed than the shaft 35. The coupling 40 then operates to drivingly connect the shaft 35 to output shaft 37 and positively drives the shaft 35 and the auxiliary wheels 30, 31, thus automatically providing a four-wheel drive when the shaft 37 rotates relative to the shaft 35. It should be apparent that the shaft 37 rotates relative to the shaft 35 under those conditions wherein the primary drive wheels 25, 26 slip or lose traction and rotate at a speed which is different from the speed of the auxiliary drive wheels 30, 31. More specifically, if the drive wheels 25, 26 slip or lose traction, the drive wheels 25, 26 continue to rotate through the drive from the transfer box 18. However, since the wheels 25, 26 are slipping rather than driving the vehicle along the ground, the wheels 30, 31 are rotating at a slower speed than the drive wheels 25, 26, or are stationary. In this event, upon a predetermined speed of rotation of the primary drive wheels 25, 26 relative to wheels 30, 31, the coupling 40 is operative to drivingly connect the front or auxiliary drive wheels 30, 31 to the transfer box mechanism 18, thus automatically driving the front wheels of the vehicle.

The coupling 40, as shown in FIG. 2, comprises a pair of coupling members 41, 42 and a clutch means 43 interposed between the coupling members 41, 42. The coupling member 41 is connected through a spline connection generally designated 45 so that shaft 37 is driven by the transfer box mechanism 18 at the same speed as the drive shaft 21 when the transfer box is shifted to its "four-wheel drive" condition. The coupling member 42 is connected through a suitable spline connection, designated 46, to a part 47 of the universal connection 36 which is rotated at the speed of the drive shaft 35. From the above description, it is clear that the coupling member 42 rotates at the speed of rotation of the shaft 35 and that the coupling member 41 rotates at the speed of rotation of the shaft 37. As will be apparent from the description hereinbelow, when the vehicle is being operated in "four-wheel" drive the clutch means 43 functions to permit "free wheeling" of the coupling member 42 relative to the coupling member 41 under normal driving conditions and drivingly connects the coupling member 42 to the coupling member 41 upon slip of the rear wheels 25, 26 which results in rotation of the shaft member 37 relative to the shaft member 35, and in turn, rotation of the coupling member 41 relative to the coupling member 42.

The coupling member 41 is in the form of a housing and comprises an adapted flange member 49, a cylindrical housing member 50 and a flange member 51. The adapter flange member 49 has a hub portion 52 which is splined to the shaft 37 to provide a driving connection between the coupling member 41 and shaft 37. The adapter flange member 49 is held against axial movement on the shaft 37 by a nut 53 which is threaded onto the outer end of the shaft 37 and is located in a central recess 54 in the flange member. A suitable thrust washer 55 is positioned between the nut member 53 and the splined portion of the shaft 37 at the bottom of the recess 54. The nut 53 holds the flange member 49 in engagement with a bearing assembly 56, schematically shown, located in the housing of the transfer box 18 and which engages and supports the hub portion 52 of the flange member 49.

The adapter flange member 49 also includes a radially extending flange portion 57 which extends from the hub portion 52 radially outwardly thereof, to which the housing member 50 is secured. The housing member 50 is secured to the flange member 51 at its other end so that these members provide a unitary housing. The flange member 51 includes a hub portion 58 having an opening extending therethrough, a radially extending portion 60 connected at one end to the hub portion 58, and an axially extending portion 61 which is adapted to interfit with the member 50. The housing member 50, adapter flange member 49 and the flange member 51 are secured together by suitable bolts 62 which extend through aligned openings therein. The housing formed by these members includes a chamber 63 therein having a generally cylindrical portion defined by an axially extending surface 64 forming an inner periphery of the housing member 50.

The coupling member 42 extends into the chamber 63 and comprises a shaft-like splined portion 42a connected to the universal joint part 47, and a body portion 42b. The universal joint part 47 includes a sleeve portion 65 which surrounds the shaft portion 42a and is held against rotation with respect to the shaft portion by the spline connection 46 therebetween. The shaft portion 42a and the part 47 are fixed against axial movement relative to each other by a nut 70 threaded onto a projecting shaft portion at the left side of the coupling member 42 as viewed in FIG. 2, and a washer 71 and O-ring seal 72 are interposed between the nut member 70 and the universal part 47.

The body portion 42b of the coupling member 42, is located in the chamber 63 and includes an enlarged portion 76 having a plurality of planar surface portions 77 thereon forming the outer periphery thereof so that the body portion forms a regular polygon in cross-section. The extreme right end of the coupling member 42 has a recess 78 therein for receiving the nut 53 which secures the adapter flange member 50 on the shaft 44.

The coupling member 42 is supported for rotation relative to the coupling member 41, and to this end, a pair of needle bearings 80, 81 are interposed between the coupling members. The needle bearing 80 is located in the recess 54 in the flange member 50 and includes bearing members which support the extreme right end of the body portion 42b of the coupling member 42. The sleeve portion 65 of the part 47 extends into the opening in the hub portion 58 of the housing member 51 and is rotatably supported by the needle bearing 81 which is positioned in a counterbore 83 in the opening. A suitable seal is positioned in the counterbore 83 on the outboard side of the bearing 81 for preventing leakage of fluid between the sleeve 65 and hub portion 58. From the above description it can be readily seen that the coupling member 42 is rotatably supported within the coupling member 41 and that these members may rotate freely with respect to each other.

The clutch means 43 is operable in response to relative rotation between the coupling members 41, 42 to drivingly connect the coupling members 41, 42 so as to transmit torque from the shaft member 37 to the coupling member 42 and to the front or auxiliary drive wheels 30, 31 of the vehicle 10. The clutch means 43 comprises a double overrunning clutch means which includes roller cage 91 and a plurality of rollers 92 rotatably supported by the roller cage. The roller cage 91 is a generally cylindrical member preferably formed or suitable sheet metal and includes a plurality of axially extending openings or slots 91a therein, each of which loosely receives a roller 92. The slots 91a maintain the circumferential spacing of the rollers 92 around the coupling member 42 and prevent substantial axial movement of the rollers relative to the coupling members. The number of rollers 92 supported by the roller cage 91 correspond in number to the planar surface areas 77 forming the periphery of the coupling member 42 so that each roller 92 is engageable with one surface 77 of the coupling member 42 and is also engageable with the surface 64 of the housing member 51.

The clutch means 43 is movable from a position shown in FIG. 3, wherein the rollers 92 permit "free wheeling" of the coupling member 42 relative to the coupling member 41, to the position shown in FIG. 4, wherein the rollers 92 wedgingly engage the surfaces 64 and 77 to drivingly connect the coupling members 41, 42, in response to a predetermined speed of relative rotation between the coupling members 41, 42.

In the illustrated and preferred embodiment, the clutch means 43 is actuated between its positions by the action of a fluid coupling means 100 of the viscous shear type including a flange portion 101 of the roller cage 91 and a cooperating viscous shear chamber 102 formed in the coupling member 41 and communicating with the chamber 63. The shear chamber 102 is defined by axially spaced substantially parallel surface portions 103, 104 formed on the housing member 50 and adapter flange member 51, respectively, and which are connected by a narrow cylindrical surface portion 105 formed in the housing member 51 to define the chamber portion 102 and forming a narrow channel extending radially from the chamber 63 at the right hand end thereof as viewed in FIG. 2. The chamber 63 is filled with a suitable silicone fluid which is introduced into the chamber by way of a passage extending through the portion 60 of the housing member 51. A threaded plug member 63a is removably positioned in the filled passage to provide a closure for the chamber 63 and the silicone fluid is received in the chamber portion 102 between the surfaces 103, 104 and the flange portion 101 of the cage 91.

Upon rotation of the surface portions 103, 104, on the coupling member 41 relative to the flange portion 101 on the cage 91, a viscous drag is established therebetween through the action of the silicone fluid in the shear chamber 102. The viscous drag on the flange portion 101 is effective to exert a torque on the roller cage 91 which urges the roller cage circumferentially relative to the coupling member 42 to move the rollers 92 from a disengaged position (see FIG. 3) to a position wherein the rollers are wedgingly engaged between the surfaces 64, 77 of the coupling members, respectively so that the coupling members are drivingly connected thereby. The rollers 92 are held in wedging engagement with the aforementioned surfaces of the coupling members by the torque transmitted between the members and remain in wedging engagement until torque is no longer transmitted therethrough.

In accordance with the present invention biasing means are provided for maintaining the clutch means 43 positively positioned in its disengaged position and for resisting movement of the clutch means 43 to its engaged position until the predetermined relative speed of rotation is reached between the coupling members 41, 42. As illustrated in FIG. 2 the biasing means comprises a compression spring means 110 which biases the cage 91 and the rollers 92 carried thereby into their position shown in FIG. 3 wherein the rollers are located so that a radial line extending through the center of rotation of the coupling member 42 and through the center of rotation of the rollers 92 substantially bisects the surfaces 77. When the rollers are in the position just described there is a slight amount of play or clearance between the rollers 92 and the surfaces 64, 77 so that the coupling member 42 is able to "free wheel" relative to the coupling member 41.

Figure 5:
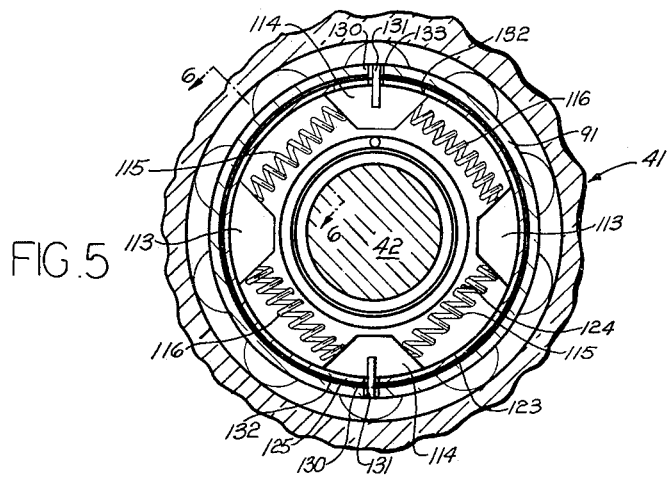
FIG. 5 is a sectional view taken approximately at line 5—5 of FIG. 2.
Figure 6:
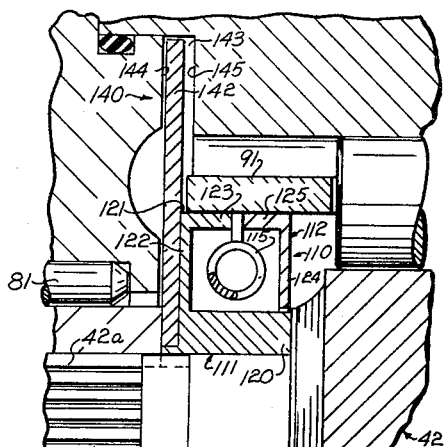
FIG. 6 is a fragmentary sectional view of a portion of FIG. 6 and taken approximately along section line 6—6 of FIG. 5.

As best seen in FIGS. 2, 5 and 6, the spring means 110 includes a two-part spring housing assembly including a first spring retainer member 111 fixed to the coupling member 42, and a second spring retainer member 112 movably supported on the retainer member 111. Spring seat members 113, 114 are carried by the spring retainers 111, 112 respectively, and a plurality of helical springs 115, 116, are disposed between the spring seats 113, 114 and within the retainer members 111, 112. The first spring retainer member 111 includes a tubular or sleeve-like body portion 120 which is snugly received on the shaft portion 42a of the coupling member 42 and fixed thereto by a suitable fastener, and a cup-like retainer portion 121 comprising a radially outwardly extending wall portion 121 carries the spring seats 113 which are spaced approximately 180 degrees apart around the retainer portion and are suitably fixed to the retainer portion such as by brazing.

The retainer member 112 is an annular cup-like member formed of suitable sheet-like material and includes a radially extending portion 124 and an axially extending flange portion 125 forming an outer periphery thereof. The inner periphery of the radially extending portion 124 is supported by the body portion 120 of the retainer member 111 and yet movable relative thereto. The retainer member 112 supports the spring seats 114 which are suitably attached thereto at locations spaced 180 degrees apart from each other and 90 degrees from the spring seats 113 carried by the spring retainer member 111. The flange portions 123, 125 of the retainer members 111, 112, respectively, extend toward each other so that an annular chamber is provided between the retainer members in which the aforementioned spring seats are positioned. The springs 115, 116 are compressively engaged between adjacent spring seats as best seen in FIG. 5 and maintain the first and second spring retainer members in positions wherein adjacent spring seats 113, 114 are spaced about 90 degrees apart from each other around the retainer assembly.

The spring retainer member 112 includes narrow axially extending slots 130 in the flange portion 125 thereof which receive tabs 131 which are fixed to the spring seats 114 of the second retainer member 112 and extend radially outwardly of the retainer assembly through the slots 130. The flange portion 123 of the first retainer member 111 includes axially extending slots 132 which are considerably wider than the slots 130 in the second retainer member 112 and which are aligned to overlap the slots 130 in the second retainer member 112 with a portion of the tabs 131 extending radially outwardly therethrough.

The tabs 131 extend through narrow axially extending slots 133 in the cage member 91 and due to the action of the springs 115, 116 upon the spring seats 114 connected to the retainer member 112, the cage member 91 is maintained in its position wherein the clutch means 43 is disengaged as described above.

When the primary ground engaging wheels 25, 26 lose traction and the coupling member 41 rotates at the predetermined speed of rotation relative to the coupling member 42, the viscous shear forces built up between the surfaces 103, 104 and the flange portion 101 on the cage member 91 tend to rotate the cage 91 relative to the coupling member 42 so that the viscous shear force is transmitted from the cage member 91 to the tabs 131 of the spring means to effect rotation of the retainer member 112 relative to the retainer member 111 and further compression of the springs 115 or 116 between adjacent spring seats which are moving toward each other depending on the direction of rotation of the coupling member 41 relative to the coupling member 42. If for example, the coupling member 41 rotates relative to the member 42 in a clockwise direction as viewed in FIG. 5, the springs 116 are compressed between the seats 113, 114 due to the retainer member 112 being rotated in a clockwise direction. The springs 115 are relaxed as the retainer member 112 is so moved. As the viscous shear forces continue to increase, the springs 115 continue to be compressed until the clutch means 43 is moved sufficiently to drivingly connect the coupling members 41, 42 as described above.

When torque is no longer being transmitted through the coupling 40, the rollers 92 are disengaged from the surfaces 64, 77 and the springs 115 return the cage 91 to its position wherein the coupling members are disengaged.

As noted above in vehicles of the type described it is often desirable to shift the drive to its "two-wheel drive" condition wherein the vehicle is driven solely by the primary ground engaging wheels 25, 26 and with the auxiliary wheels incapable of driving regardless of loss of traction of the primary wheels. In such a vehicle it is conventional to shift the mechanism of the transfer box 18 so that the auxiliary drive shaft member 37 connected to the input coupling member 41 is disconnected from the drive train of the vehicle. When the transfer box is in the above noted "two-wheel drive" condition the connecting shaft 37 is no longer driven and tends to come to rest. It should be apparent from the foregoing description that whenever the shaft member 37 slows down, or ceases to rotate, the input coupling member 41 likewise slows down or stops due to the spline connection 45 therebetween. It should further be apparent that as the vehicle is being driven, the front wheels 30, 31 continue to rotate at substantially the same speed as the primary driving wheels 25, 26 and that this rotation is transmitted from the wheels 30, 31 through the axles 32, the differential drive mechanism 33 and the shaft 35 to the output coupling member 42. With the output coupling member 42 continuing to rotate at a speed proportional to the speed of rotation of the front wheels 30, 31 and the input coupling member 41 slowing down, it is clear that at some vehicle speed, the speed of relative rotation between the input and output coupling members is sufficient to engage the clutch means 43 so that the coupling member 42 is drivingly connected to the coupling member 41 and the auxiliary drive shaft 37. When the coupling member 41 and shaft 37 have been brought up to the speed of the coupling member 42, no substantial amount of torque is transmitted through the coupling 40 and the clutch means 43 is disengaged, thereby permitting the coupling member 41 and shaft 44 to again slow down and again be drivingly connected to the coupling member 42 by the clutch means at the predetermined differential in speed therebetween. This action of the coupling means 40 when the vehicle is in two-wheel drive manifests itself in a cyclic "thumping" noise most discernible at a speed of approximately 20 m.p.h. and which is accompanied by needless and undesirable wear of the parts of the coupling.

In accordance with the present invention means are provided for preventing operation of the clutch means 43 when the transfer box is in its "two-wheel drive" condition. Preferably the aforementioned means includes drive transmitting means 140 for driving the coupling member 41 from the coupling member 42 during "two-wheel" driving of the vehicle. The illustrated drive transmitting means is in the form of a fluid coupling which is operable to maintain the speed of relative rotation between the coupling member 41 and the coupling member 42 at a speed below the predetermined speed, so that viscous shear forces acting on the clutch means 43 are never sufficient to engage the clutch means between the coupling members when the vehicle is in "two-wheel drive." As best shown in FIG. 2 the fluid coupling means 140 includes an annular disc-like member 142 compressively engaged between the sleeve member 65 and the spring retainer member 111 so as to be connected to the input coupling member 42 for rotation therewith, and a narrow annular chamber portion 143 formed by surfaces 144, 145 of the members 50, 51 of the input coupling member 41. The chamber portion 143 forms a viscous shear chamber which communicates with the chamber 63 in the coupling to receive viscous shear fluid therefrom so that as the speed of the coupling member 42 increases relative to the rotational speed of the coupling member 41, viscous shear forces between the surfaces 144, 145 and the disc member 142 increase and rotate the coupling member 41 and associated shaft 37. Although the driving force created by the viscous shear coupling means 140 is sufficient to rotate the coupling member 41 and shaft 37 at speeds which are high enough to prevent engagement of the clutch means 43 as described.

In view of the fact that the fluid coupling means 140 is connected directly between the coupling members 41, 42 and independently of the clutch means 43, the coupling means 140 has substantially no effect on the operation of the clutch means 43 when the vehicle is in "four-wheel drive" and the rear wheels lose traction or slip, since the driving torque transmitted from the coupling member 41 to the coupling member 42 through the fluid coupling means 140 is relatively insignificant in effecting driving of the auxiliary wheels 30, 31.

Figure 7:
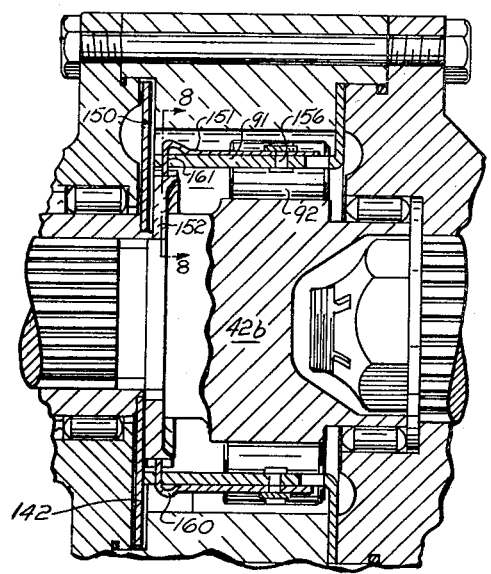
FIG. 7 is a fragmentary view of a modified portion of a vehicle drive embodying the invention.
Figure 8:
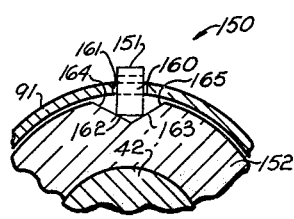
FIG. 8 is a fragmentary view taken approximately at line 8—8 of FIG. 7.

A modified vehicle drive embodying the present invention is illustrated in FIGS. 7 and 8 wherein all of the elements of the coupling members 41, 42 are the same as described above in reference to FIGS. 1–6 and the clutch means 43 is also similar to that described above, except that a modified spring biasing means 150 is utilized to maintain the clutch means positively positioned in its disengaged position until the predetermined slip speed between the coupling members is obtained. The spring biasing means 150 is of a detent-like construction and includes a spring member 151 connected to the cage member 91 and a thrust washer 152 connected to the coupling member 42 and cooperable with the spring member to maintain the clutch means 43 in its disengaged position at slip speeds between the coupling members below the aforementioned predetermined slip speed.

The spring member 151 is formed by an elongated thin sheet of spring material which is connected to the roller cage 91 at its outer periphery by a suitable rivet 156 and extends along the roller cage 91 parallel to the axis of rotation of the rollers 92 and toward the left as viewed in the drawings. The left end 160 of the spring member 151 is bent so as to extend radially inwardly of the roller cage 91 through a suitable opening 161 in the roller cage adjacent its left hand end as viewed in the drawings. The radially inward end surface 162 of the end portion 160 of the spring cooperates with a groove 163 formed in the washer member 152 and which has a generally V-shaped cross-section formed by surfaces 164 and 165 which are engageable with the radially inner end surface 162 of the spring member 151.

The washer member 152 is interposed between the disc member 142, described above, and the body portion 42b of the coupling member 42 and is tightly engaged between these members by tightening of the nut 70 associated with the universal joint part 47. It should be apparent then that the washer member 152 is fixedly secured to the coupling member 42 and rotates therewith.

The spring member 151 is tensioned so that the end portion 160 thereof is urged toward the washer member 152 at all times, and when the slip speed between the coupling members 41, 42 is below the aforementioned predetermined slip speed the end portion 160 of the spring is urged into engagement with the surfaces 164, 165 of the groove 163 of the washer member so that the spring centers itself between the surfaces and at the base of the groove. Since the spring member 151 is connected to the roller cage 91, the centering action at the end of the spring is effective to move the roller cage circumferentially relative to the coupling member 42 and for this reason the groove 163 in the washer member is aligned with the coupling member 42 so that when the end 160 of the spring 151 is centered in the groove 163 the rollers 92 are maintained in their disengaged position (see FIG. 3) by the cage member 91. It should be apparent then that the spring 151 positively maintains the rollers 92 in their disengaged position at slip speeds below the predetermined speed.

As the slip speed between the coupling members increases to the predetermined speed, the viscous drag forces on the cage member 91 increases and the cage is urged circumferentially relative to the coupling member 42 as described hereinabove. At the predetermined slip speed between the members the viscous shear force overcomes the centering force of the spring 151 and moves the cage circumferentially relative to the coupling member 42 with the end surface 162 of the spring 151 being moved along one of the surfaces 164, 165 of the groove, and radially outwardly with respect to the cage 91. Circumferential movement of the cage causes driving connection of the coupling members 41, 42 by the rollers 92 and during driving connection of the coupling members the end surface 162 of the spring 151 is positioned on one of the aforementioned surfaces 164, 165. When the coupling member 41 rotates in a counterclockwise direction relative to the coupling member 42, as viewed in FIG. 8, the end 160 of the spring is cammed outwardly by the surface 164 of the washer 152 as the cage 91 moves counterclockwise relative to the coupling member 42. Conversely, when the coupling member 41 rotates clockwise relative to the member 42, the spring end is cammed outwardly by the surface 165 of the groove 163 as the cage 91 moves.

When the torque transmitted between the coupling members 41, 42 is no longer sufficient to maintain the rollers 92 in driving engagement between the surfaces 77, 64, the tension in the spring 151 causes the end surface 162 thereof to slide relative to the cam surface upon which it is located and thus to effect movement of the cage 91 to its position wherein the rollers 92 are in the disengaged positions as described above.

While two embodiments of the present invention have been illustrated and described herein in considerable detail, the present invention is not to be considered to be limited to the precise construction shown.

Having described my invention, I claim:

1. A drive mechanism comprising relatively rotatable first and second drive members, clutch means operatively associated with said drive members, said clutch means having a first condition providing for relative rotation of said first and second drive members and a second condition drivingly connecting said first and second members to retard relative rotation therebetween, actuating means for actuating said clutch means to its second condition in response to a predetermined degree of relative rotation between said first and second drive members and operable to actuate said clutch means to its second condition when said first drive member rotates relative to said second drive member by said predetermined degree, and drive means operatively associated with said first and second drive members for applying a driving force to said first drive member from said second drive member independently of said clutch means when said second drive member rotates relative to said first drive member and said clutch means is in said first condition.

2. A drive mechanism as defined in claim 1 and further including biasing means for maintaining said clutch means in its first condition and for resisting actuation of said clutch means to its second condition by said actuating means, said biasing means comprising a spring connected with said clutch means, reaction means connected to said second member and including a spring seat engageable with a part of said spring, and means connecting said spring to said clutch means including a connecting member engaging said spring and said clutch means.

3. A drive mechanism comprising relatively rotatable first and second drive members, said first drive member being connectable with and disconnectable from a power sources, clutch means operatively associated with said drive members, said clutch means having a first condition providing for relative rotation of said first and second drive members and a second condition drivingly connecting said first and second members to retard relative rotation therebetween, actuating means for actuating said clutch means to its second condition in response to a predetermined degree of relative rotation between said first and second drive members and operable to actuate said clutch means to its second condition when said first drive member rotates relative to said second drive member by said predetermined degree, and drive means operatively associated with said first and second drive members for applying a driving force to said first drive member from said second drive member when said second drive member rotates relative to said first drive member, said drive means being operable to drive said first drive member when said first drive member is disconnected from said power source so that the degree of relative rotation between said first and second drive members is below said predetermined degree of relative rotation.

4. A drive mechanism as defined in claim 3 wherein said drive means comprises a fluid coupling means including a first surface connected to said first drive member and a second surface connected to said second member, said first and second surfaces being spaced apart to define a fluid shear space therebetween for reception of a viscous shear fluid.

5. A drive mechanism as defined in claim 4 wherein said second surface is formed on a disc member which is drivingly connected to said second member for rotation therewith and which extends into a slot defined by said first drive member.

6. A drive mechanism comprising relatively rotatable first and second drive members, clutch means operatively associated with said drive members, said clutch means having a first condition providing for relative rotation of said first and second drive members and a second condition drivingly connecting said first and second members to retard relative rotation therebetween, actuating means for actuating said clutch means to its second condition in response to a predetermined degree of relative rotation between said first and second drive members and operable to actuate said clutch means to its second condition when said first drive member rotates relative to said second drive member by said predetermined degree, said actuating means including a viscous coupling associated with said clutch means and effective to move said clutch means to drivingly connect said first and second drive members, and drive means operatively associated with said first and second drive members for applying a driving force to said first drive member from said second drive member when said second drive member rotates relative to said first drive member, said drive means including another viscous drive coupling associated with said first and second drive members.

7. A drive mechanism comprising relatively rotatable first and second drive members, clutch means operatively associated with said drive members, said clutch means having a first condition providing for relative rotation of said first and second drive members and a second condition drivingly connecting said first and second members to retard relative rotation therebetween, actuating means for actuating said clutch means to its second condition in response to a predetermined degree of relative rotation between said first and second drive members and operable to actuate said clutch means to its second condition when said first drive member rotates relative to said second drive member by said predetermined degree, drive means operatively associated with said first and second drive members for applying a driving force to said first drive member from said second drive member when said second drive member rotates relative to said first drive member, and biasing means for maintaining said clutch means in its first condition and for resisting actuation of said clutch means to its second condition by said actuating means, said biasing means including a coil compression spring member connected with said clutch means, reaction means connected to said second member and including a spring seat engageable with a part of said spring, and means connecting said spring to said clutch means including a connecting member engaging said spring and said clutch means, said connecting member including a second spring supported by said second member for movement relative thereto with said clutch means.

8. A drive mechanism as defined in claim 7 wherein said second spring seat is movable toward said first spring seat when said clutch means moves from its first to its second condition to compress said spring member therebetween.

9. A drive mechanism as defined in claim 8 wherein said first spring seat is attached to housing means connected to said second member and said second spring seat is attached to second housing means movably supported by said first housing means.

10. A drive mechanism comprising first and second rotatable members, clutch means operatively associated with said first and second members and operable between a first condition wherein said members are capable of rotation relative to each other and a second condition wherein said clutch means retards relative rotation of said first and second members, actuating means operatively associated with said first and second members and said clutch means and responsive to a predetermined speed of relative rotation between said first and second members to actuate said clutch means from its first condition to its second condition, and biasing means for urging said clutch means to said first condition and for resisting actuation of said clutch means from said first condition at speeds of relative rotation of said members below said predetermined speed, said biasing means including a spring member extending between said clutch means and one of said rotatable members, reaction means connected with said second member and including a part having a surface engageable with a part of said spring, and means connecting said spring member to said clutch means including a member engaging said spring and said clutch means.

11. A drive mechanism comprising relatively rotatable first and second drive members, clutch means operatively associated with said drive members, said clutch means having a first condition providing for relative rotation of said first and second drive members and a second condition drivingly connecting said first and second members to retard relative rotation therebetween, actuating means for actuating said clutch means to its second condition in response to a predetermined degree of relative rotation between said first and second drive members and operable to actuate said clutch means to its second condition when said first drive member rotates relative to said second drive member by said predetermined degree, drive means operatively associated with said first and second drive members for applying a driving force to said first drive member from said second drive member when said second drive member rotates relative to said first drive member and biasing means for maintaining said clutch means in its first condition and for resisting actuation of said clutch means to its second condition by said actuating means, said biasing means including a spring connected with said clutch means, reaction means connected to said second member and including a spring seat engageable with a part of said spring, and means connecting said spring to said clutch means including a connecting member engaging said spring and said clutch means, said spring seat including a first cam surface on said reaction means and cooperable with a surface on said spring, said surface of said spring and said cam surface being movable relative to each other.

12. A drive mechanism comprising first and second rotatable members, clutch means operatively associated with said first and second members and operable between a first condition wherein said members are capable of rotation relative to each other and a second condition wherein said clutch means retards relative rotation of said first and second members, actuating means operatively associated with said first and second members and said clutch means and responsive to a predetermined speed of relative rotation between said first and second members to actuate said clutch means from its first condition to its second condition, and biasing means for urging said clutch means to said first condition and for resisting actuation of said clutch means from said first condition at speeds of relative rotation of said members below said predetermined speed, said biasing means including a spring member extending between said clutch means and one of said rotatable members, reaction means connected with said second member and including a part having a surface engageable with a part of said spring, and means connecting said spring member to said clutch means including a member engaging said spring and said clutch means, said reaction means including first and second angularly related cam surfaces, and wherein said spring engages said surfaces depending upon the direction of rotation thereof.

13. A drive as defined in claim 12 wherein said clutch means includes a plurality of clutch elements and an annular cage member for maintaining said elements in spaced relation about a periphery of one of said rotatable members, said cage member shiftable relative to said rotatable members to move said elements relative to said rotatable members, and said spring member being connected to an outer periphery of said cage member and extending radially inwardly of an inner periphery thereof into engagement with said reaction means.

14. A drive mechanism comprising first and second rotatable members, clutch means operatively associated with said first and second rotatable members and operable from a first condition wherein said members are free to rotate relative to each other to a second condition wherein said clutch means drivingly connects said first and second rotatable members, actuating means operatively associated with said first and second rotatable members and said clutch means, said actuating means being responsive to a predetermined speed of relative rotation between said first and second rotatable members to operate said clutch means from its first condition to its second condition, and biasing means for urging said clutch means to its first condition and for resisting operation of said clutch means to its second condition at speeds of relative rotation of said members below said predetermined speed, said biasing means comprising a coil spring member acting between one of said coupling members and said clutch means.

15. A drive mechanism as defined in claim 14 wherein said coil spring member engages first and second spring seats carried by first and second members respectively, drivingly connected with said clutch means and said second member.

16. A drive mechanism as defined in claim 15 wherein said clutch means includes a plurality of movable elements and an annular cage member for maintaining said elements in spaced relation to each other about a periphery of one of said rotatable members, said cage member being operable to effect shifting movement of said elements relative to said rotatable members, and a connecting part extending between said cage member and said second spring seat to effect movement of said second spring seat upon shifting of said cage member.

References Cited
UNITED STATES PATENTS

| | | | |
|---|---|---|---|
| 3,055,471 | 9/1962 | Warn et al. | |
| 3,300,002 | 1/1967 | Roper | 192—38 XR |
| 3,324,744 | 6/1967 | Roper | 74—711 |
| 3,388,779 | 6/1968 | Roper. | |

CARLTON R. CROYLE, Primary Examiner
ALLAN D. HERRMANN, Assistant Examiner

U.S. Cl. X.R.

180—44; 192—38, 48.3, 57